United States Patent [19]
Johnson

[11] Patent Number: 5,500,730
[45] Date of Patent: Mar. 19, 1996

[54] METHOD AND APPARATUS FOR DETERMINING THE DISTANCE TO A REFLECTIVE EVENT

[75] Inventor: Robert W. Johnson, Marcy, N.Y.

[73] Assignee: Laser Precision Corp., Utica, N.Y.

[21] Appl. No.: 298,370

[22] Filed: Aug. 30, 1994

Related U.S. Application Data

[63] Continuation of Ser. No. 19,265, Feb. 16, 1993, abandoned.

[51] Int. Cl.⁶ ................................................. G01N 21/00
[52] U.S. Cl. ...................... 356/73.1; 250/227.15
[58] Field of Search ...................... 356/73.1; 250/227.15

[56] References Cited

U.S. PATENT DOCUMENTS

| | | | |
|---|---|---|---|
| 5,042,943 | 8/1991 | Mallinson et al. | 356/73.1 |
| 5,062,703 | 11/1991 | Wong et al. | 356/73.1 |
| 5,066,118 | 11/1991 | Buerli | 356/73.1 |
| 5,069,544 | 12/1991 | Bureli | 356/73.1 |
| 5,078,489 | 1/1992 | Lieber | 356/73.1 |
| 5,104,391 | 4/1992 | Ingle et al. | 606/11 |
| 5,130,535 | 7/1992 | Kummer et al. | 356/73.1 |
| 5,131,743 | 7/1992 | Kaneko et al. | 356/73.1 |
| 5,149,961 | 9/1992 | Arnold et al. | 250/227.11 |
| 5,353,110 | 10/1994 | Jones | 356/73.1 |

*Primary Examiner*—Robert P. Limanek
*Assistant Examiner*—David B. Hardy
*Attorney, Agent, or Firm*—Harris Beach & Wilcox

[57] ABSTRACT

There is presented an apparatus and method of locating a reflective anomaly in an optical fiber. An optical generator is positioned at one end of a light path extending to and from a reflective anomaly in an optical fiber, and periodic pulses of light are injected into the fiber. A bend coupler containing directional optical detectors is clamped to the optical fiber in mid-span, between the optical generator and a reflective anomaly, and light energy is tapped. The coupler is capable of detecting and discriminating light travelling in both longitudinal directions. After signal conditioning and digitization, the light pulses are submitted to a logical network to initiate a timer that measures a time interval between the event of an interrogating light pulse, and its reflection, the result being memorized in a buffer. A microprocessor controls the system, and computes distance between the attached bend coupler and the reflective anomaly as a function of the memorized time interval. The result is then displayed for the user. The system enables a fault to be rapidly and accurately located in a multidrop installation without violating intermediate fibers.

15 Claims, 8 Drawing Sheets

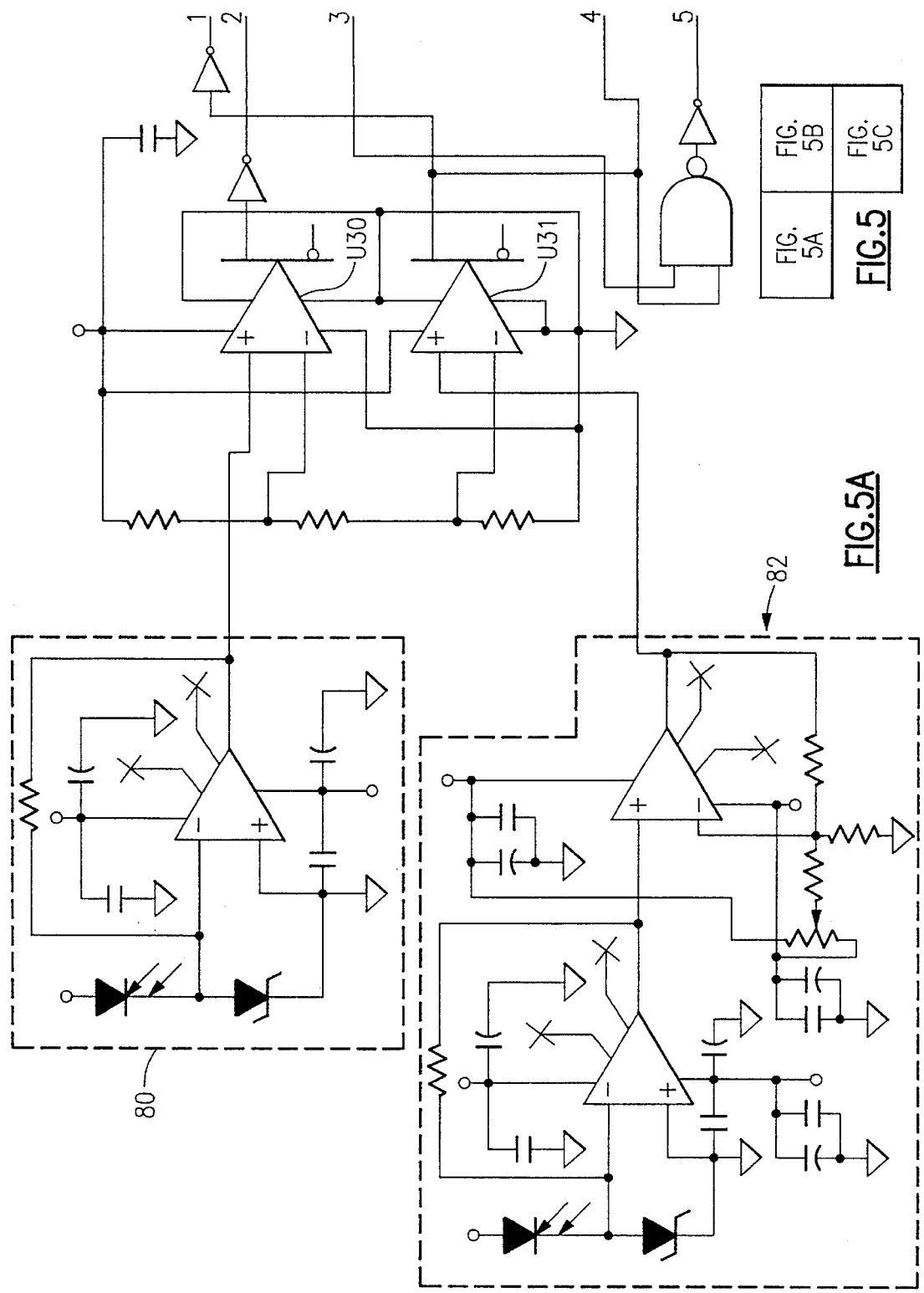

METHOD AND APPARATUS FOR DETERMINING THE DISTANCE TO A REFLECTIVE EVENT

This is a continuation of application(s) Ser. No. 08/019,265 filed on Feb. 16, 1993, now abandoned.

BACKGROUND OF THE INVENTION

1. Field of the Invention

This invention relates to a method and apparatus for inspecting fiberoptic communication paths. In particular it relates to the field of optical time domain reflectometry (ODTR) and to the correlation of optical and physical distances from an observer to a reflective event.

2. Description of the Prior Art

Conventional ODTR methods that are employed for the detection of splice points or discontinuities in optical fibers rely on the injection of optical energy at a launch point, and the reception of reflected or backscattered light by a receiver. A common reason to dispatch a field worker is a broken or damaged cable that appears to the ODTR instrument as a short fiber. For the most part, reflective events are the result of an interface of glass and air, and are therefore characteristic of many breaks. It is the reflective property of the discontinuity that can be used to determine the distance from a given point to the discontinuity without having to break the fiber mid-span.

An OTDR instrument evaluates a characteristic of the reflected light to determine the optical distance to a reflective event. Once the optical distance to an event has been determined, a worker must physically locate the break. Because the optical and physical distances to an event are often quite different, it would be advantageous for a worker in the field who is seeking an anomaly to check its location from time to time. In order to do this using conventional OTDR, it is necessary to attach a field instrument to the fiber. Because of fused splices, this may not be feasible. Fiber in the Loop (FITL) deployments call for a multidrop, rather than a point-to-point architecture as exists in today's inter-toll plant. Applying conventional ODTR methods to an FITL installation results in a confusing, and for the most part, unintelligible picture. It would be highly desirable for a field worker to rapidly access feeder fibers at multidrop points, look down the branches, and "see" reflective anomalies, so that a defect in the fiber can be expeditiously located and repaired.

SUMMARY OF THE INVENTION

It is therefore a primary object of the present invention to permit a worker to determine the location of a reflective event in an optical fiber by accessing an intact fiber mid-span between a light source and the reflective event.

It is a further object of the present invention to facilitate the detection of reflective anomalies in optical fibers of multidrop installations.

It is another object of the present invention to expedite the maintenance and repair of optical fiber systems.

These and other objects of the present invention are attained by an apparatus having two physically detached units. First a generator of periodic light pulses, which may be derived from long wavelength lasers, is applied to the end of a fiberoptic path that extends to the furthest significant reflective event and back to the source. The periodicity of the pulses is adjusted to equal or exceed the two-way transit time of the light pulses along the fiberoptic path. The pulse width and amplitude are adjusted to provide sufficient energy to be detected by a measuring device, and yet yield sufficient spatial resolution of multiple events. One realization employs the laser output from a conventional ODTR instrument that is attached to the fiber and fired repetitively.

The second unit is disposed at some point along the fiber intermediate the generator and a reflective event of interest. This unit has several functions. It extracts light travelling through the fiber, and identifies the presence and general longitudinal direction of interrogating pulses from the generator that are en route to the reflective event, and of reflected pulses returning toward the generator.

Light extraction is accomplished by a clamp for bending the fiber. A Source Detector and a Reflection Detector disposed in or near the clamp differentially sense light leaking from the core through the cladding layer in predetermined directions, so that the general longitudinal direction of a light pulse in the fiberoptic path passing by the clamp can be determined. Analysis of the detector responses by a control logic section allows interrogating and reflected pulses to be discriminated.

The control logic also implements a timing algorithm that involves the application of a clock to a timer, the resetting of the timer, and the loading of one or more value buffers to determine the time of flight, and hence the distance from the clamp to a reflective anomaly.

The method for determining the distance from the clamp position to the furthest significant reflection is as follows. With the second unit in a quiescent or wait state an interrogating pulse is detected. The control logic thereupon initiates a timer by applying a clock thereto. When a reflected pulse is received, the count value in the timer is memorized in a buffer. Upon detection of the next interrogating pulse, or an overflow condition in the timer, the clock is removed from the timer, and the latter is reset. The distance from the clamp to the last reflective event is calculated from the value in the buffer according to the equation $$X = (c \times t)/(2 \times I)$$

where

X is the distance to the reflection;

c is the speed of light;

t is the memorized time in the buffer; and

I is the index of refraction for the fiber under test.

In the case where multiple reflections are present, it is assumed that the reflected pulse last received must be from the furthest significant reflection. The transfer of succeeding timer values into the buffer overwrites the contents of the buffer that were memorized from a preceding transfer from the timer. Thus the value in the buffer when the timer is reset corresponds to the time value of the last reflective pulse received.

As used herein, the terms reflective event and reflective anomaly contemplate any condition or anomaly in an optical fiber that affects the return of light from an interrogating beam. This includes Fresnel reflections from an interface, as would arise, for example, from a physical discontinuity or break. It also includes conditions in the fiber that affect Rayleigh backscatter but may not produce Fresnel reflections. Examples of the latter include bends, or other physical anomalies that do not create an actual disruption in the fiber. For clarity of explanation, pulses herein are often shown as spike waveforms. However it is intended that the invention not be limited to such waveforms, and the term pulse is used in an expanded sense to include any relatively abrupt transition, either positive or negative, from a first magnitude to a second magnitude in the photon flux of light passing through the fiber. Examples of such transitions include step functions that might be observed in the level of backscatter when the fiber contains one or more bends.

BRIEF DESCRIPTION OF THE DRAWINGS

For a better understanding of these and other objects of the present invention, reference is made to the detailed description of the invention which is to be read in conjunction with the following drawings, wherein:

FIG. 5 indicates the relationship of FIGS. 5A–5C; and

FIGS. 5A, 5B, 5C, 6, and 7 are schematics of electronic circuitry in a preferred embodiment of the invention.

DESCRIPTION OF THE PREFERRED EMBODIMENT

Figure 1:
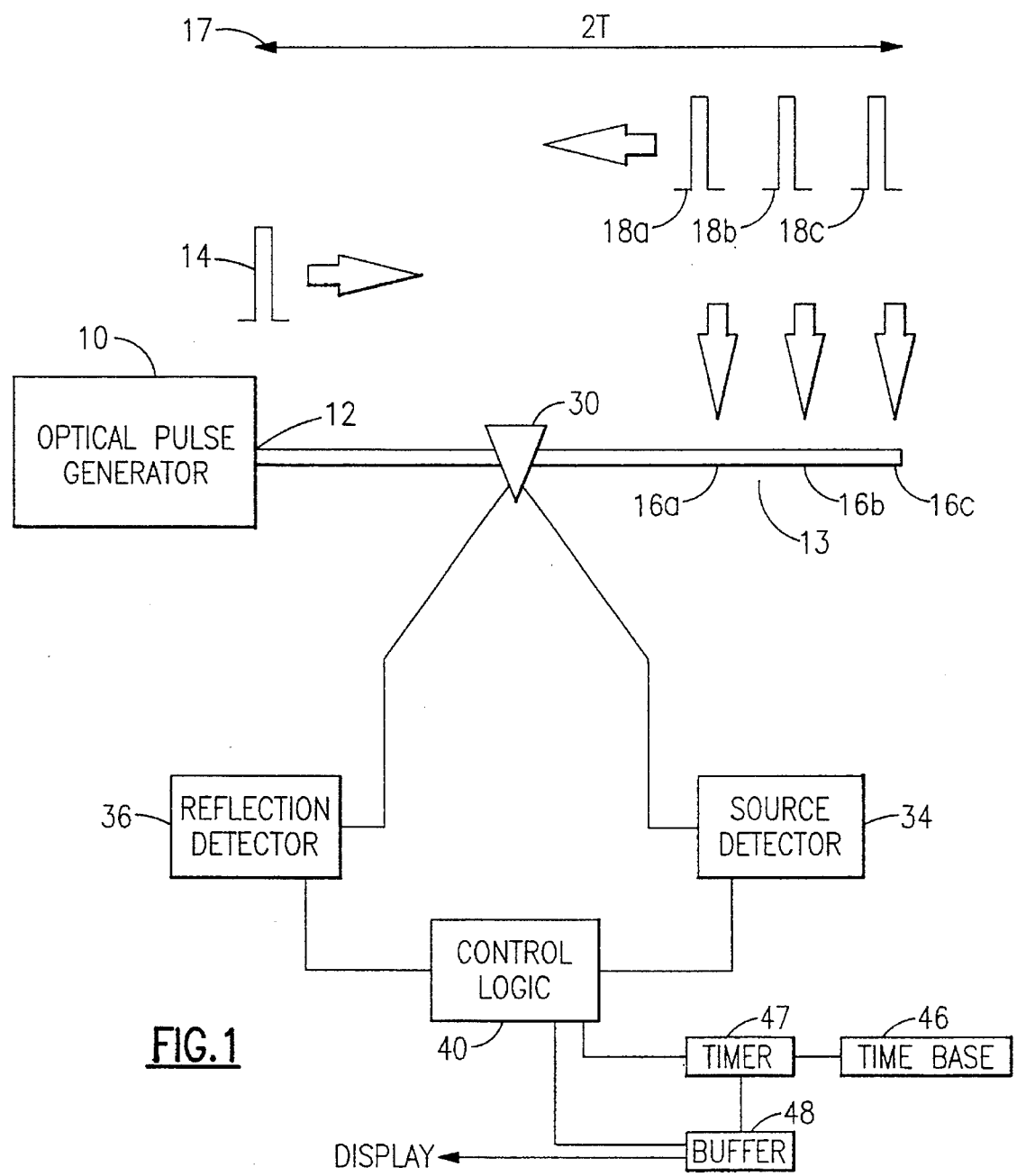
FIG. 1 is a schematic of the measurement system in accordance with the invention.

Turning now to the drawings, and initially to FIG. 1 there is shown in block diagram an apparatus in accordance with the invention which is attached to an optical fiber 13 having reflective anomalies 16a, 16b, and 16c therein. Optical pulse generator 10 is interfaced to one end 12 of the fiber 13, and is configured to produce periodic interrogating pulses of light, shown representatively as pulse 14, traveling in the direction of the right arrow in FIG. 1 along a light path within the optical fiber 13. When pulse 14 strikes reflective anomalies 16a, 16b, 16c, some or all of the light energy is reflected in the opposite longitudinal direction, returning toward optical generator 10 as reflected pulses 18a, 18b, and 18c traveling in the direction of the left arrow. Optical pulse generator 10 is conventional, and preferably generates long wave laser pulses. The system works well with the pulse generator of Laser Precision ODTR model TD-2000. It is desirable that the generator permit adjustment of the periodicity and pulse width of the optical pulses to accommodate to variations in fibers being tested. Optical pulse generator 10 is adjusted so that the periodicity of the pulses equals or exceeds the two-way transit time 17 of the light pulses along the fiberoptic path between optical generator 10 and the farthest significant reflective anomaly 16c. The pulse width is adjusted to provide sufficient energy to be detected by a measuring device, and yet yield sufficient spatial resolution of multiple events.

Figure 2:
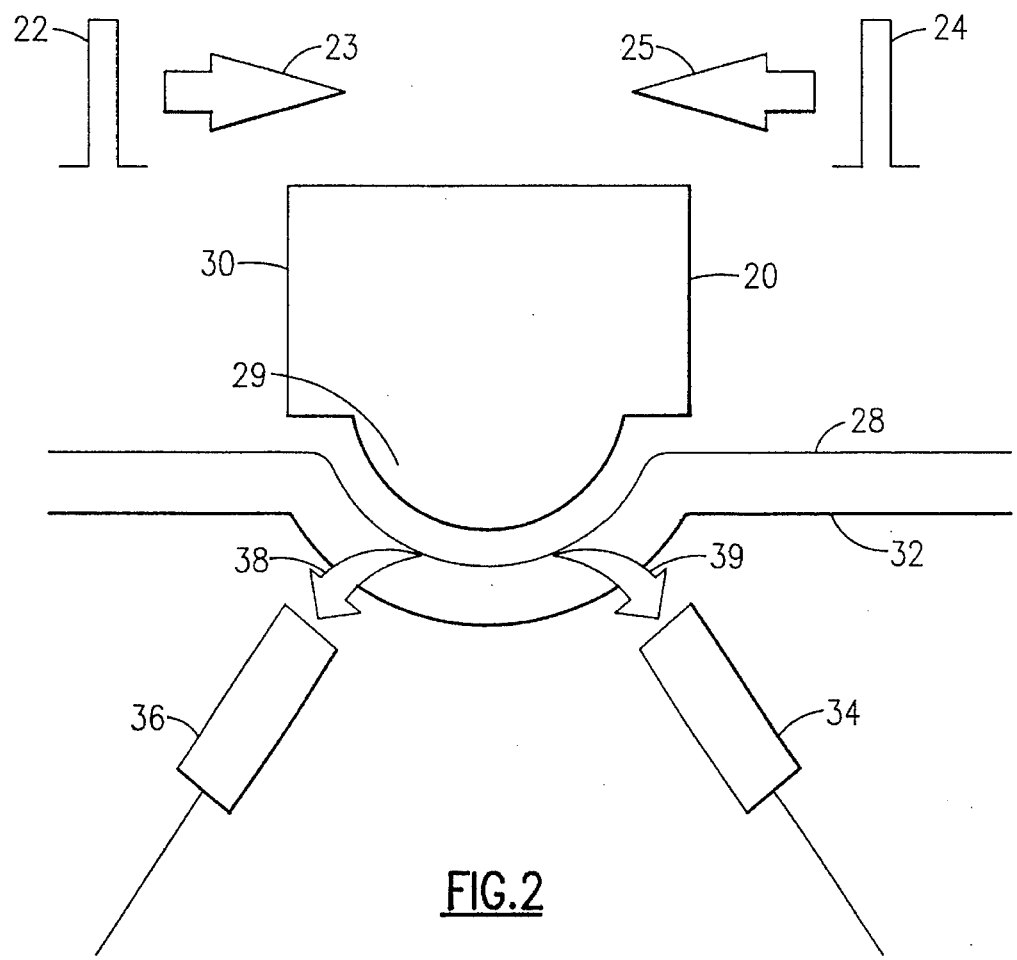
FIG. 2 is a more detailed schematic illustration of a portion of the system of FIG. 1.

Turning now to FIG. 2, detector unit 30, a bidirectional bend coupler, is clamped to segment 28 of the optical fiber which is being tested. Segment 28 is located intermediate optical pulse generator 10 and the reflective anomalies 16a, 16b, 16c. The detector unit includes an anvil 20 having a convex protuberance 29 which bears on fiber segment 28, causing it to deform against retainer 32. The angular deformation of the fiber results in light leakage from its core through the cladding. An interrogating pulse is shown at reference numeral 22, travelling in the direction indicated by arrow 23. When pulse 22 reaches the zone of fiber deformation opposite protuberance 29 some of its light energy escapes in the direction indicated by arrow 39. Similarly a reflective pulse 24, travelling in the direction indicated by arrow 25 leaks from segment 28 in the direction of arrow 38.

Source detector 34 and reflection detector 36 are directional optical detection devices that are known to the art, and are sensitive to the light wavelengths emitted by optical pulse generator 10. Detectors 34 and 36 are disposed near protuberance 29 at substantially right angles to one another, and capture light energy indicated by arrows 39 and 38 respectively.

Figure 3:
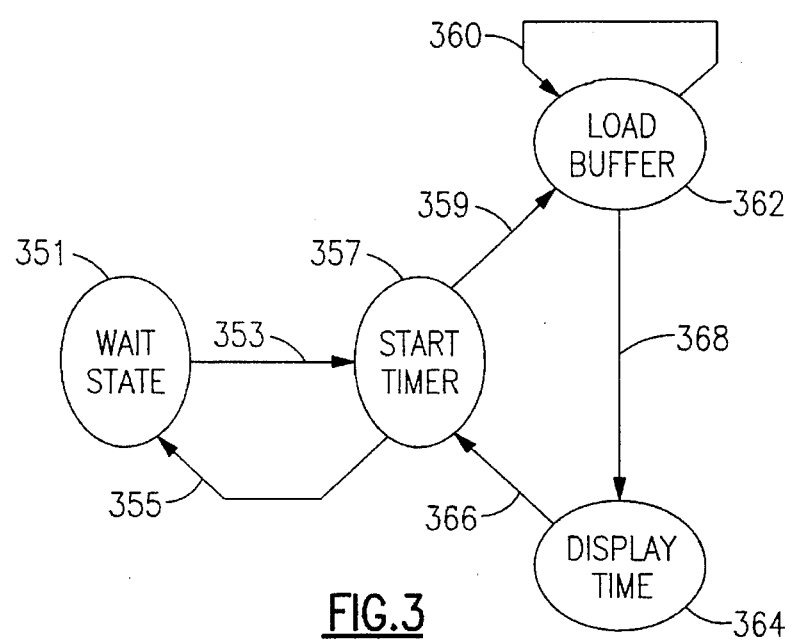
FIG. 3 is a state diagram illustrating a procedure followed in the system of FIG. 1.

Returning to FIG. 1, the outputs of source detector 34 and reflection detector 36 are connected to control logic 40. Control logic 40 is a set of state logic that emulates an algorithm controlling the application of a clock operating with reference to time base 46 to a timer 47, the resetting of the timer 47, and the loading of a buffer 48 which holds the value of the timer. This can be appreciated with reference to the state diagram in FIG. 3, in which timer 47 is initially in wait state 351. When interrogating pulse 14 has been detected by source detector 34, indicated by arrow 353, timer 47 is started, resulting in a transition to state 357. Arrow 359 indicates the condition that reflection detector 36 has detected a reflective pulse, such as pulse 18a, deriving from reflective anomaly 16a in optical fiber 13. The value held by timer 47 is loaded into buffer 48, shown as state 362. Successive loading of buffer 48 upon detection of reflected pulses 18b, 18c is indicated by arrow 360. When a succeeding interrogating pulse 14 is detected, the value of buffer 48 is displayed, indicated by arrow 368 and state 364. The timer is reset, indicated by arrow 366 and arrow 355, and the timer thereupon assumes wait state 351. The value displayed in buffer 48 is a measure of the distance to the last received reflective event at anomaly 16c, the farthest significant reflective event from detector unit 30.

Figure 5B:
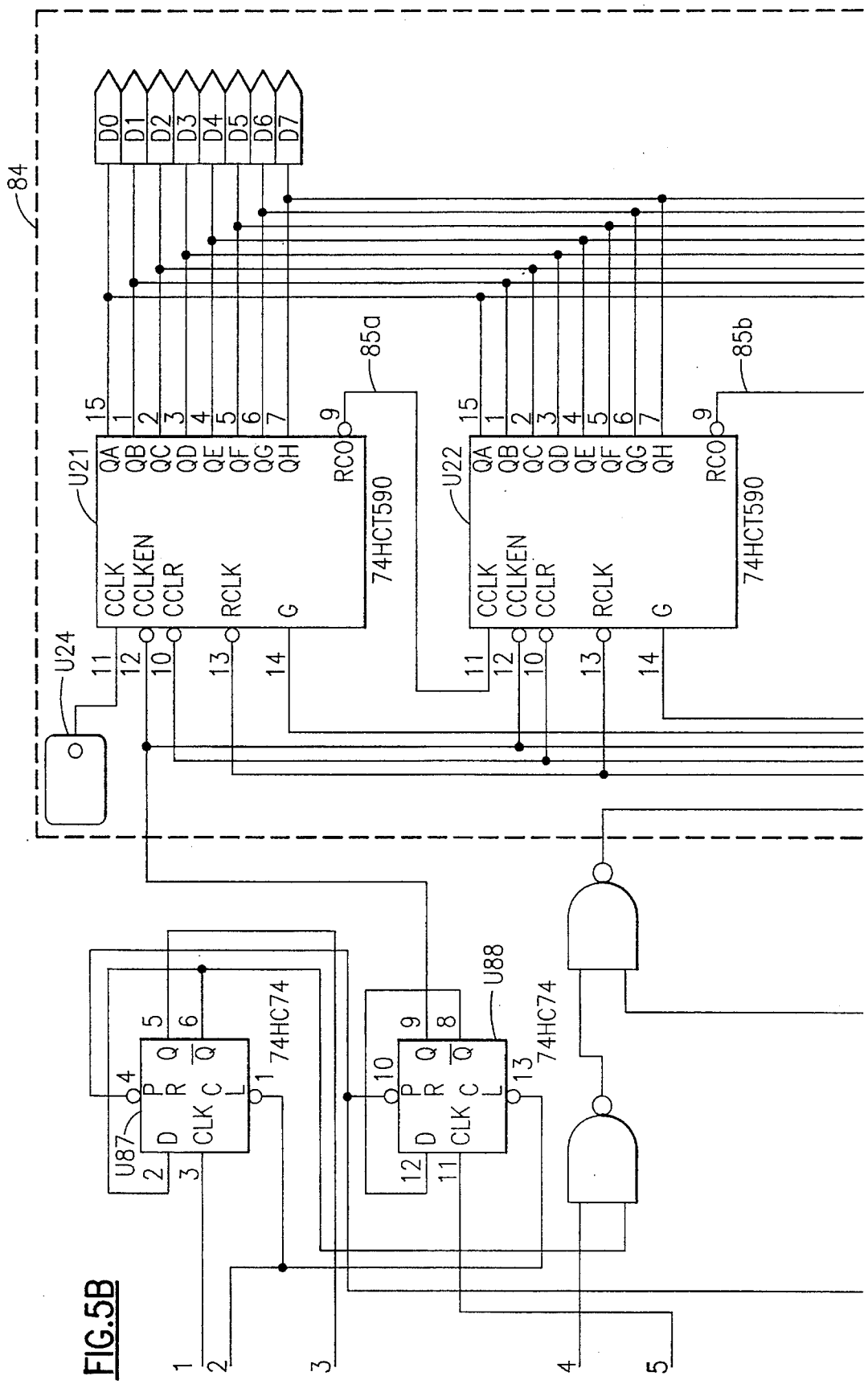
Figure 5C:
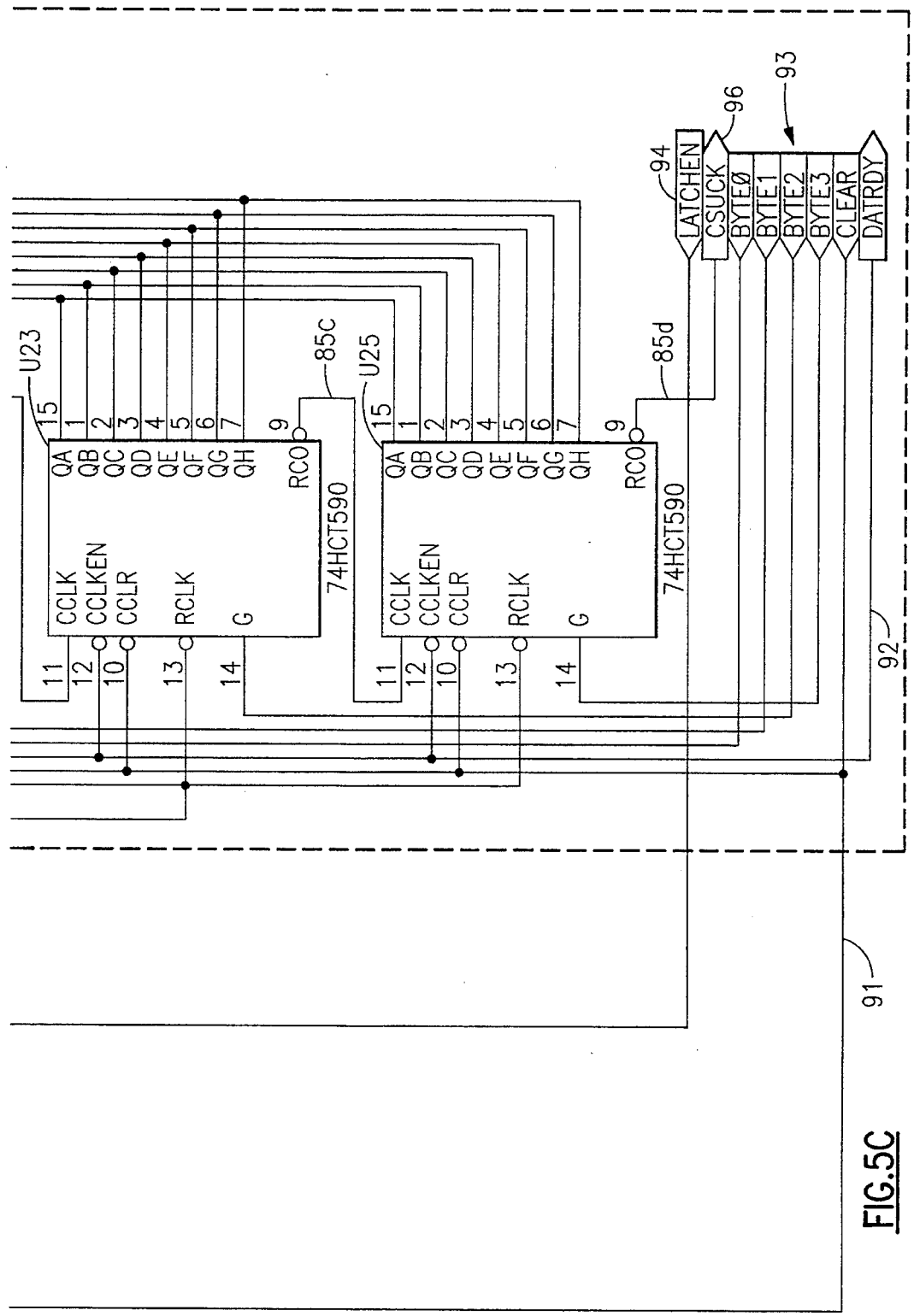
Figure 7:
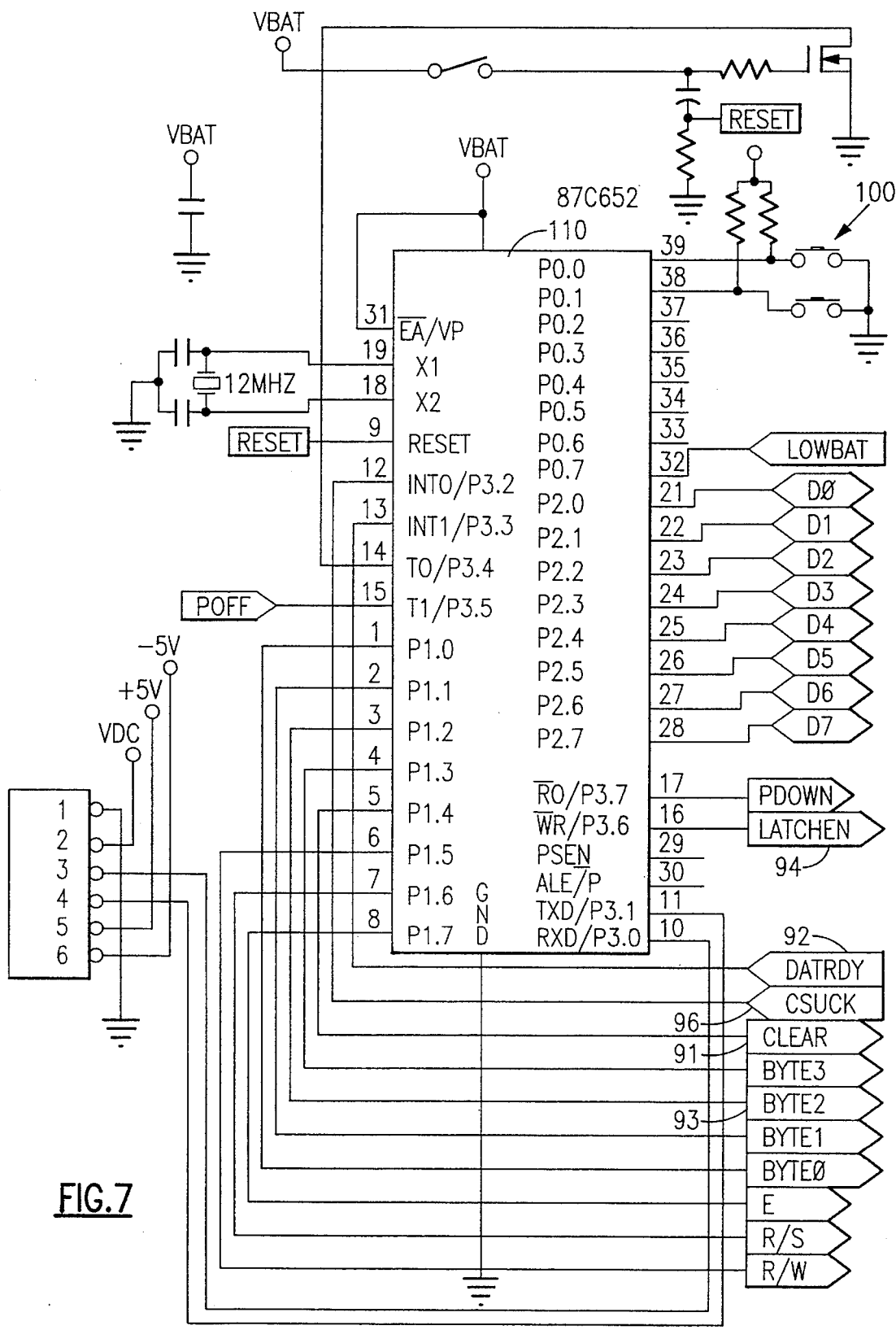
Figure 6:
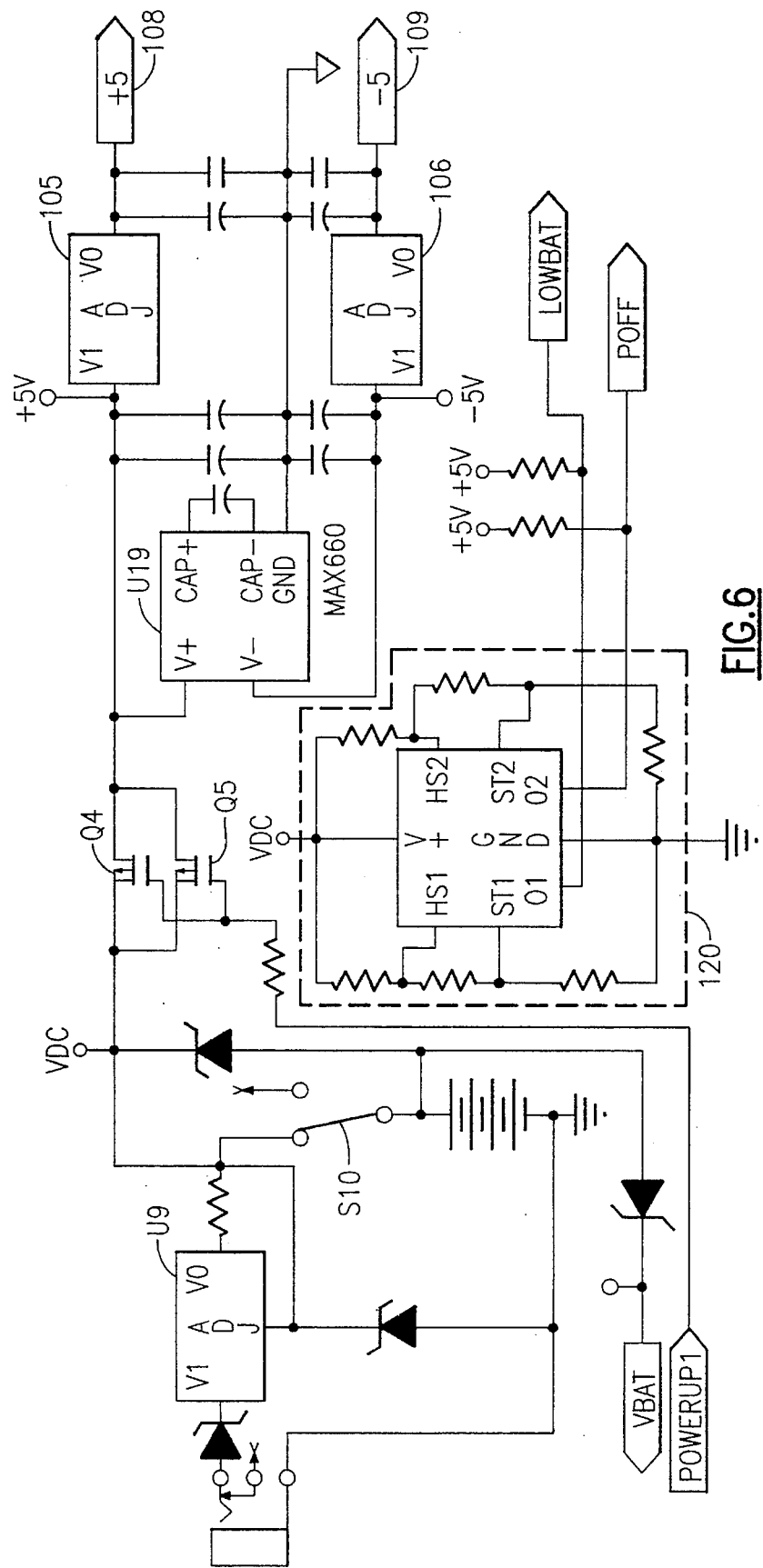

The fault locator hardware in accordance with the invention is illustrated schematically in FIGS. 5–7. The output of detectors 34, 36 first undergo signal conditioning. Since the signals deriving from reflected pulses are much more attenuated than that resulting from a source or interrogating pulse, reflection detector 36 is connected to an amplifier section 80 having a greater gain than the amplifier section 82 associated with source detector 34. Amplifiers in sections 80 and 82 are connected to the inputs of comparators U30 and U31 respectively, which generate clean, digitized TTL level outputs.

Signals asserted by comparators U30, U31 are coupled to a 32 bit counter 84 (FIG. 5B), which is realized as four cascaded 8-bit counters U21, U22, U23, and U25. Counter 84 operates at a known frequency, having an input connected to a 20 mHz oscillator U24.

The 8-bit counters U21, U22, U23, and U25 each have an internal data latch and tri-state latch outputs. The counter control signals consist of a count enable input, which starts and stops the counters, a latch enable input (LATCHEN), which latches the current count value to the internal latches, an output enable input, which causes the latch content to be placed on the eight tri-state counter outputs, and a clear input (CLEAR), which clears the counter. Each counter stage has a count input and a count overflow. The input to the first counter U21 is connected to the oscillator U24, and the overflow 85d from the last counter U25 is used to indicate to the microcontroller 110 (see FIG. 7) that a count overflow has occurred. The overflow 85a, 85b, 85c from each of the counters U21, U22, U23 is connected to the count input of the next succeeding counter, thus cascading the 8-bit counters to form a single 32-bit counter.

Figure 4:
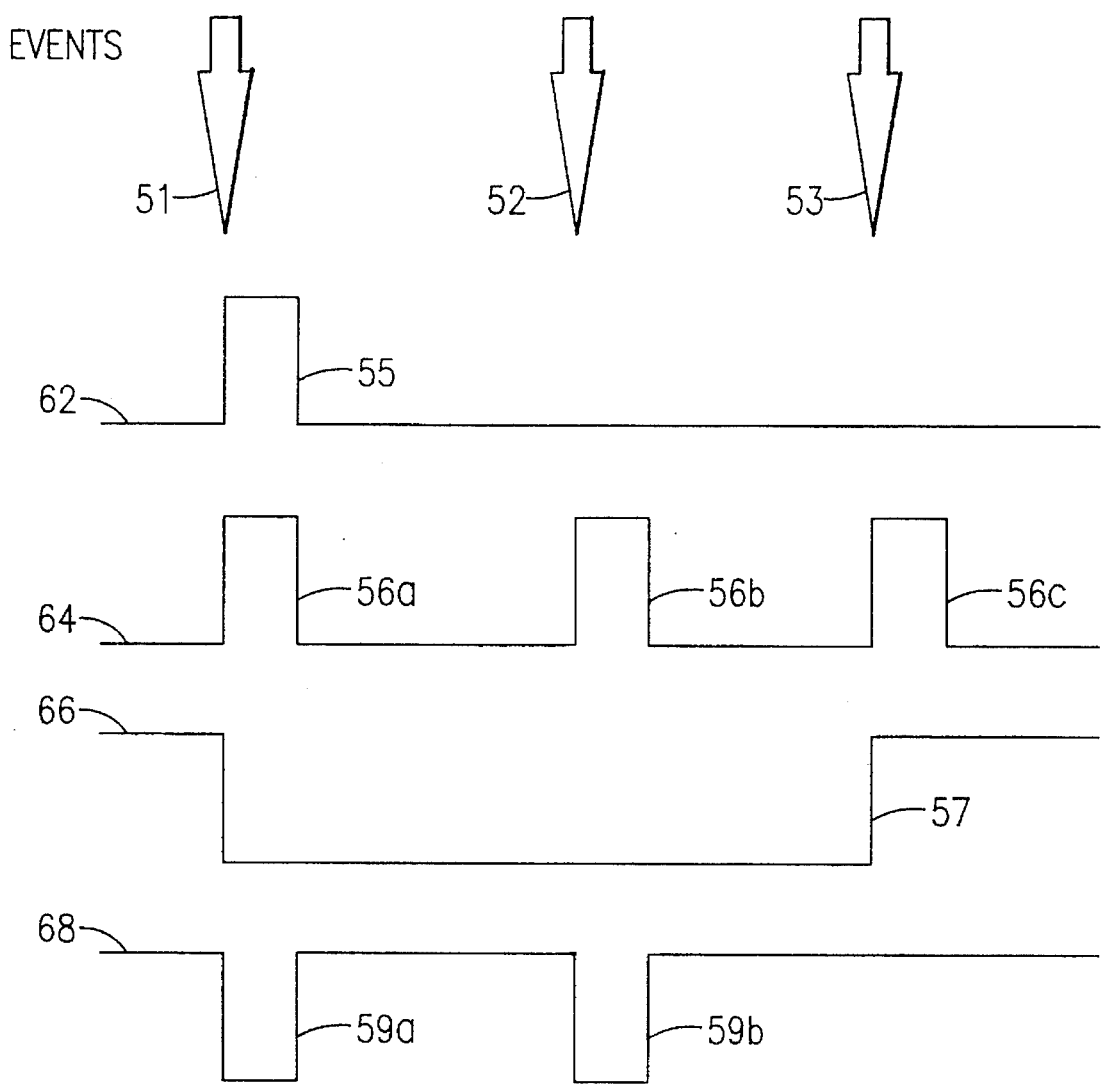
FIG 4 is a timing diagram that is useful in understanding the operation of a preferred embodiment of the invention.

The clock enable inputs and the latch enable inputs of 8-bit counters U21, U22, U23, U25 are controlled by a logical group connected between the outputs of comparators U30, U31 and counter 84. This logic is realized by two D latches U87, U88 configured as flip-flops, and supporting HCTTL logic to generate the timing diagram shown in FIG. 4, in which events 51, 52, 53 are indicated by three downwardly directed arrows. In FIG. 4 signal 62 represents the output comparator U30, wherein pulse 55 is indicative that an interrogating light pulse has been detected. Signal 64 similarly represents the output of comparator U31, pulses 56a, 56b, 56c indicating the detection of reflected light pulses. Signal 66 is the clock enable signal, and signal 68 represents latch enable.

The counters and logic are initialized to a cleared state by CLEAR signal 91 asserted by microcontroller 110. The system then waits for an interrogating light signal (event 51). This generates simultaneous signals at the inputs of comparators U30, U31, which latches zeros (the initial count) to the latches of counter 84, and starts the counter. When a reflection from a first (or only) event is detected (event 52), the current value of counter 84 is latched in by the second low pulse 59b of signal 68, and counter 84 continues counting. On detection of a second reflection (event 53) clock enable signal 66 goes inactive, and the counter is halted. Clock enable signal 66 is monitored by microcontroller 110 via DATARDY input 92, and when it changes state, the microcontroller 110 reads the data from each 8-bit counter in order. This is controlled by the output enable inputs on each counter (BYTE0–BYTE3, indicated collectively by reference numeral 93). When this data is read, microcontroller 110 toggles the latch enable line LATCHEN 94 to latch the final count to the latches, and then reads the latches as above.

If only one reflective anomaly reflects light back down the fiber, the first count is latched to the counter latches, but the counter 84 is never disabled. The counters eventually overflow, and the microcontroller 110, which is monitoring output CSUCK 96, senses this state, resets the logic, and reads the latched count for only one fault. It is also possible to program the microcontroller to read the latched count upon arrival of a successive interrogating pulse.

If there are no faults in the range of the optics, event 52 in FIG. 4 never occurs; the latch enable line 94 is not activated, and the counter overflows. Since the latch enable was toggled at event 51, zeros were latched to the latches. The microcontroller 110 reads these zeroes out, and determines that no fault was located. The logic is then cleared for the next test.

The microcontroller section, indicated generally at 100 in FIG. 7, includes an 87C51 derivative microcontroller 100 with on-board ROM and RAM. Well known external components include a micro clock, reset circuitry, and power-down detection. There are provisions for a keyboard, and external connections for a light source to make the device self-contained. A 2×16 character display (not shown) is interfaced to the microcontroller using the 8-bit interface for the counters.

Referring to FIG. 6, power for the device comes from either 6 AA NiCad batteries, 6 AA alkaline batteries, or from a combination battery charger/AC power supply. A switch S10 is included to prevent the AC battery charger from charging the alkaline batteries. A constant current source U9 is used to regulate power from the AC adaptor. A pair of switching FETs Q4, Q5 enables the microcontroller 110 to control power to the analog circuitry and the counter section 84. A charge pump U19 and two linear regulators 105, 106 generate a noise-free +5 and −5 volt supply for the detector amplifiers 80, 82, available at points 108 and 109 respectively.

A voltage detection circuit 120 is also included to enable the microcontroller 110 to monitor battery condition. The thresholds are set for 6.6 volt low battery warning, and a 6.2 volt battery fail.

In addition to general housekeeping, counter and logic control, voltage detection, and display updates as discussed above, the microcontroller 110 must convert the counts obtained from counter 84 to distances. This is done by multiplying the count by the constant $5.120 \times 10^{-3}$ km/count. This constant is derived from the following:

$$X \text{ km} = \frac{\text{count}}{2} \times \frac{1 \text{ sec}}{20 \times 10^6 \text{ counts}} \times$$

$$2.998 \times 10^8 \frac{m}{\text{sec}} \times \frac{1}{1.464} \times 1 \frac{\text{km}}{1000 \text{ m}}$$

where
- count /2 is the collected count divided by 2 (since the count represents the time the light took to travel to the fault and back, it is divided by 2 for a one-way measurement);
- 1 sec /20×10⁶ is the inverse of the counts per second, derived from the 20 mHz counter clock;
- 2,998×10⁸ m /sec is the speed of light in air; and
- 1 /1.464 is the index of refraction of light in glass.

Since the above equation render the constant in terms of meters, it needs to be converted to km.

The microcontroller 110 may also be required to average several readings together before converting to km in order to increase accuracy.

If desired, the microcontroller 110 can be programmed to store count values associated with successive reflective events such as 52, 53 in its onboard memory, compute distances corresponding to each such event, and display the distances for the user.

To locate a reflective anomaly, the following steps are performed. First, the optical pulse generator is positioned at a convenient access point and optical pulses are directed through the fiber toward the reflective anomaly of interest. Second, detector unit 30 is clamped onto the fiber, or onto a branch fiber of a network. The initial position of unit 30 is not critical, so long as it is intermediate the pulse generator and the fault being sought. Third, an initial measurement of the distance between unit 30 and the fault is taken. Fourth, if there are no nodes or branches between unit 30 and the fault, the worker may proceed directly to the fault to make repairs. If there are intervening nodes or multidrop points, the worker repositions detector unit 30 beyond the next node in the direction of the fault, and successively retests distally branching fibers, until the fault is again located. Step 4 is repeated until the fault is found.

While this invention has been explained with reference to the structure disclosed herein, it is not confined to the details set forth and this application is intended to cover any modifications and changes as may come within the scope of the following claims:

What is claimed is:

1. An apparatus for detecting a reflective event in an optical fiber, said apparatus comprising:

generator means for injecting discrete pulses of optical energy into an optical fiber at a first point thereof, each of said discrete pulses having a transit time of travel within said optical fiber;

means releasably disposed at a second point of said optical fiber for detecting light traveling therewithin while said optical fiber remains intact, and for determining a longitudinal direction of said light, said second point being at a user selectable location intermediate said first point and the reflective event to be detected; and timer means, coupled to said means for detecting, for measuring a time interval that is defined by detection of a first light pulse of said discrete pulses of optical energy traveling generally in a first longitudinal direction, and detection of a second light pulse of said discrete pulses of optical energy traveling generally in a second longitudinal direction.

2. The apparatus according to claim 1 further comprising:

microcontroller means, coupled to said timer means, for computing a distance between said means for detecting and a point of origination of said second light pulse in accordance with the formula:

$$X=(c \times t)/(2 \times l),$$

wherein,
X is said distance;
c is the speed of light;
t is said time interval; and
l is an index of refraction of said optical fiber.

3. The apparatus according to claim 1 wherein said discrete pulses of optical energy injected by said generator means include an interval between successive discrete pulses, said interval being at least twice said transit time of a respective discrete pulse in said fiber.

4. An apparatus for detecting a reflective event in an optical fiber that conducts light generally in a first longitudinal direction and in a second opposite longitudinal direction, said apparatus comprising:

optical generator means for injecting discrete interrogating light pulses at a first end of a light path extending to and from a reflective anomaly in an optical fiber, said pulses having a predetermined width and periodicity;

a bend coupler, attachable to said optical fiber intermediate said optical generator means and said reflective anomaly, having therein two directional optical detectors for detecting optical energy passing along the fiber in said first longitudinal direction and in said second longitudinal direction;

timer means, coupled to said optical detectors, for measuring a time interval that is defined by asynchronous detection of one of said interrogating pulses and a corresponding reflected pulse of light energy by said optical detectors, said interrogating pulse and said reflected pulse traveling along said light path in different longitudinal directions;

buffer means for holding a magnitude of said measured time interval;

a microcontroller that accepts said magnitude in said buffer means as an input and is programmed to compute a distance traveled by a respective reflected pulse of light energy along said fiber during said time interval as a function of said magnitude; and means for displaying a value of said computed distance whereby said displayed value is indicative of a position of said reflective anomaly in said fiber.

5. The apparatus according to claim 4 further comprising:

amplifier means coupled to said optical detectors in said bend coupler; and comparator means being connected to said amplifier means, for producing a digitized signal that is coupled to a logic group for enabling and disabling said timer means, said logic group being connected to said microcontroller means and to said timer means.

6. The apparatus according to claim 4 wherein said microcontroller means and said timer means are configured to measure and store a plurality of time intervals between one of said interrogating pulses and a succession of reflective pulses.

7. A method of locating a reflective anomaly in an optical fiber that conducts light generally in a first longitudinal direction and in a second opposite longitudinal direction, said method comprising the steps of:

disposing an optical generator means for injecting discrete interrogating light pulses at an end of a light path extending to and from a reflective anomaly in an optical fiber, said pulses having a predetermined width and periodicity;

attaching a bend coupler to said optical fiber intermediate said optical generator means and said reflective anomaly, said bend coupler having therein directional optical detectors for detecting optical energy passing along the fiber in said first longitudinal direction and said second longitudinal direction;

asynchronously detecting one of said interrogating light pulses and a corresponding reflected light pulse with said optical detectors, said one of said interrogating light pulses and said corresponding reflected light pulses traveling along said light path in different longitudinal directions and measuring a time interval therebetween; and computing a distance traveled by one of a said interrogating light pulses and a corresponding said reflected light pulse along said fiber during said time interval to determine a location of said reflective anomaly.

8. The method according to claim 7 further comprising the step of displaying said computed distance on a display.

9. The method of claim 7 wherein said step of computing a distance is performed in accordance with the formula:

$$X=(c \times t)/(2 \times l),$$

wherein,
X is said distance;
c is the speed of light;
t is said time interval; and
l is an index of refraction of said optical fiber.

10. The method according to claim 9 wherein said time interval "t" is an interval measured from the detection of one of said interrogating pulses until detection of a final reflected pulse.

11. An apparatus for detecting a reflective event in an optical fiber, said apparatus comprising:

generator means for injecting discrete pulses of optical energy into an optical fiber at a first point thereof, each of said discrete pulses having a transit time of travel within said optical fiber;

means disposed at a second point of said optical fiber for detecting light traveling therewithin, and for determining a longitudinal direction of said light, said second point being intermediate said first point and the reflective event to be detected;

timer means, coupled to said means for detecting, for measuring a time interval that is defined by detection of a first light pulse of said discrete pulses of optical energy traveling generally in a first longitudinal direction, and detection of a second light pulse of said discrete pulses of optical energy traveling generally in a second longitudinal direction; and microcontroller means, coupled to said timer means, for computing a distance between said means for detecting and a point of origination of said second light pulse in accordance with the formula:

$$X=(c \times t)/(2 \times l),$$

wherein,
X is said distance;
c is the speed of light;
t is said time interval; and
l is an index of refraction of said optical fiber.

12. An apparatus for detecting a reflective event in an optical fiber, said apparatus comprising:

optical generator means for injecting discrete interrogating light pulses at a first end of a light path in an optical fiber, said discrete pulses having a predetermined width and periodicity, each of said discrete pulses having a transit time of travel within said optical fiber;

first detector means being, disposed on the fiber and spaced apart from said optical generator means, said first detector means for sensing a first light pulse of said discrete interrogating light pulses emitted by said optical generator means that is traveling in a generally longitudinal direction along said light path;

second detector means, disposed on the fiber and spaced apart from said optical generator means, for sensing a second light pulse of said discrete interrogating light pulses that is reflected by an anomaly at a second end of said light path, said second light pulse traveling generally in an opposite longitudinal direction therealong, said first detector means and said second detector means further being disposed intermediate said optical generator means and said anomaly;

timer means, coupled to said first detector means and said second detector means, for measuring a time interval that is defined by asynchronous detection of said first light pulse and of said second light pulse; and means, coupled to said timer means, for computing a distance between said second detector means and said anomaly.

13. The apparatus according to claim 12 wherein said first detector means and said second detector means are co-located on said optical fiber along said light path, and further comprising:

means being, coupled to said timer means, for computing a distance between said detector means and said anomaly in accordance with the a formula:

$$X=(c \times t)/(2 \times l),$$

wherein,
X is said distance;
c is the speed of light;
t is said time interval; and
l is an index of refraction of said optical fiber; and
wherein said first detector means and said second detector means are co-located on said optical fiber along said light path.

14. The apparatus according to claim 12 wherein said time interval "t" is measured from said sensing of said first light pulse until said sensing of said second light pulse.

15. The apparatus according to claim 12 wherein the period of said injected discrete interrogating light pulses is at least twice said a transit time of a respective one of said discrete interrogating light pulses traveling light pulse in said optical fiber.

* * * * *